(12) United States Patent
Frank et al.

(10) Patent No.: US 6,621,490 B1
(45) Date of Patent: Sep. 16, 2003

(54) METHOD AND APPARATUS FOR MOTION COMPENSATION USING HARDWARE-ASSISTED ABSTRACTION LAYER

(75) Inventors: Michael Frank, Sunnyvale, CA (US); Biljana Simsic, Sunnyvale, CA (US)

(73) Assignee: ATI International, SRL, Barbados (KN)

(*) Notice: Subject to any disclaimer, the term of this patent is extended or adjusted under 35 U.S.C. 154(b) by 0 days.

(21) Appl. No.: 09/518,444

(22) Filed: Mar. 3, 2000

(51) Int. Cl.[7] ................................................. G06T 1/00
(52) U.S. Cl. ........................ 345/418; 345/503; 345/522
(58) Field of Search ............................. 345/419, 420, 345/421, 422, 426, 501, 502, 503, 522, 582, 589, 545, 531, 559, 619, 418

(56) References Cited

U.S. PATENT DOCUMENTS 5,861,893 A * 1/1999 Sturgess ..................... 345/522
5,870,097 A * 2/1999 Snyder et al. ............... 345/426
6,208,350 B1 * 3/2001 Herrera ...................... 345/430

* cited by examiner

*Primary Examiner*—Mano Padmanabhan
(74) *Attorney, Agent, or Firm*—Vedder, Price, Kaufman & Kammholz, P.C.

(57) ABSTRACT

A method and apparatus for motion compensation using a hardware-assisted abstraction layer is provided. A translator is added in the form of a set-up engine to convert graphics commands to a data structure compatible with a 3-D engine. By doing so, the 3-D engine may be used to serve the dual purposes of processing multiple types of graphics information, for example, 3-D graphics and MPEG video. As standards change and the 3-D engine is updated to accommodate new types of graphics information, the set-up engine may be modified to support the updated 3-D engine without requiring changes to drivers controlled by other entities.

31 Claims, 6 Drawing Sheets

METHOD AND APPARATUS FOR MOTION COMPENSATION USING HARDWARE-ASSISTED ABSTRACTION LAYER

FIELD OF THE INVENTION

The invention relates generally to the processing and display of images using computers and more specifically to techniques for providing compatibility with multiple types of image information.

BACKGROUND OF THE INVENTION

Modern computer systems are provided with the capability to display three-dimensional (3-D) graphics, as well as images encoded in standardized compressed formats, for example, formats defined by the Moving Picture Experts Group (MPEG). However, the standards continue to evolve, and the commands for displaying the images continue to change. Such changes have necessitated the installation of updated hardware and software used to display the images.

For example, the standards for 3-D graphics have changed frequently, while the MPEG standards have remained relatively fixed. As the standards for 3-D graphics have changed, the 3-D pipe used to process the 3-D graphics have had to change to accommodate the revised standards. When a change is made to the 3-D pipe, it may affect the operation of the 3-D pipe when processing MPEG video.

As a further complication, design of the software decoder used to process MPEG video may be influenced by an entity over which little or no control may be exerted. Thus, adaptation to new 3-D graphics standards has had to occur without change to the MPEG software decoder.

Also, the underlying graphics processing hardware changes, with hardware offering improved performance becoming available and replacing previously available hardware. Thus, compatibility issues can arise as the underlying graphics processing hardware is upgraded.

By sharing hardware between MPEG video and 3-D graphics processing, increased efficiency may be achieved. For example, the overall amount of hardware may be substantially reduced, the memory interface may be shared, and the texture caches may be shared. While this is advantageous, changes in the hardware has required changes in the command set used to control the hardware. Thus, a technique is needed to keep software packets generated by a software front-end usable within a graphics processor even as the graphics standards change and the underlying graphics processing hardware changes.

DETAILED DESCRIPTION OF A PREFERRED EMBODIMENT

A method and apparatus for motion compensation using a hardware-assisted abstraction layer is described. A translator is added in the form of a set-up engine to convert graphics commands to a data structure compatible with a 3-D engine. By doing so, the 3-D engine may be used to serve the dual purposes of processing multiple types of graphics information, for example, 3-D graphics and MPEG video. As standards change and the 3-D engine is updated to accommodate new types of graphics information, the set-up engine may be modified to support the updated 3-D engine without requiring changes to drivers controlled by other entities.

Several steps are involved in processing of video and graphics information. For example, processing of MPEG video involves variable length decoding, inverse quantization, "zig zag" processing, inverse discrete cosine transform (IDCT), and motion compensation. Motion compensation may involve interpolation of predictions and IDCT information between multiple frames of video. Motion compensation for 3-D graphics may be more involved, including processing of color, fog, transparency (alpha blending) attributes, as well as texture mapping and bilinear interpolation of multiple texture maps. The present invention provides support for motion compensation compatible with an existing hardware implementation and provides the capability to upgrade the graphics processor as new graphics formats and commands are implemented.

Figure 1:
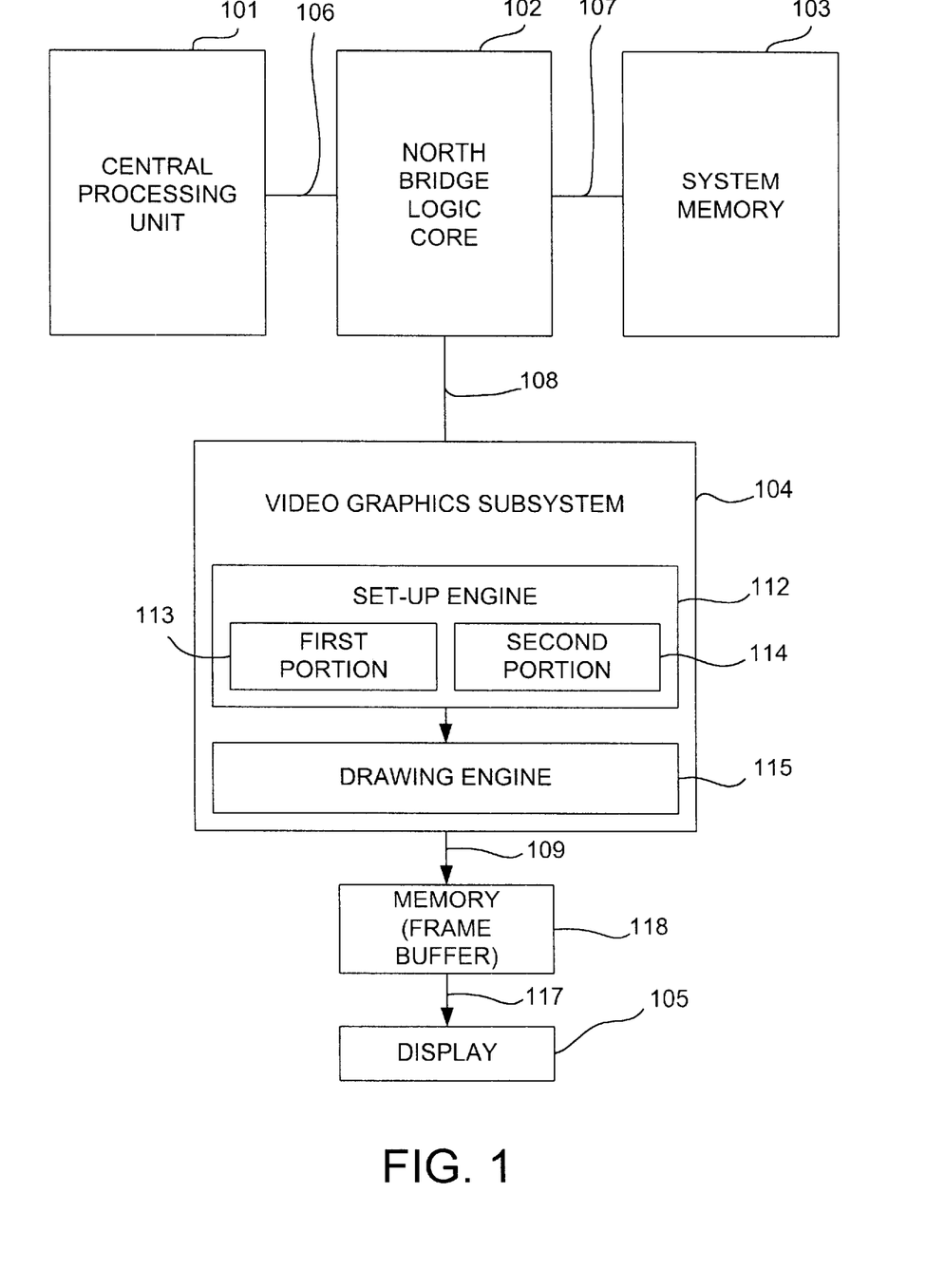
FIG. 1 is a block diagram illustrating a system in accordance with an embodiment of the present invention.

FIG. 1 is a block diagram illustrating a system in accordance with an embodiment of the present invention. The system includes central processing unit (CPU) 101, north bridge logic core 102, system memory 103, video graphics subsystem 104, and display 105. CPU 101 is coupled to north bridge logic core 102 via coupling 106. System memory 103 is coupled to north bridge logic core 102 via coupling 107. North bridge logic core 102 is coupled to video graphics subsystem 104 via coupling 108, which may, for example, be an accelerated graphics processor (AGP) bus. Video graphics subsystem 104 is coupled to memory 118, which serves as a frame buffer, via coupling 109. Memory 118 is coupled to display 105 via coupling 117. Video graphics subsystem 104 may include a setup engine 112 and a drawing engine 115. The setup engine 1 12 may include a first portion 113 and a second portion 114.

Figure 2:
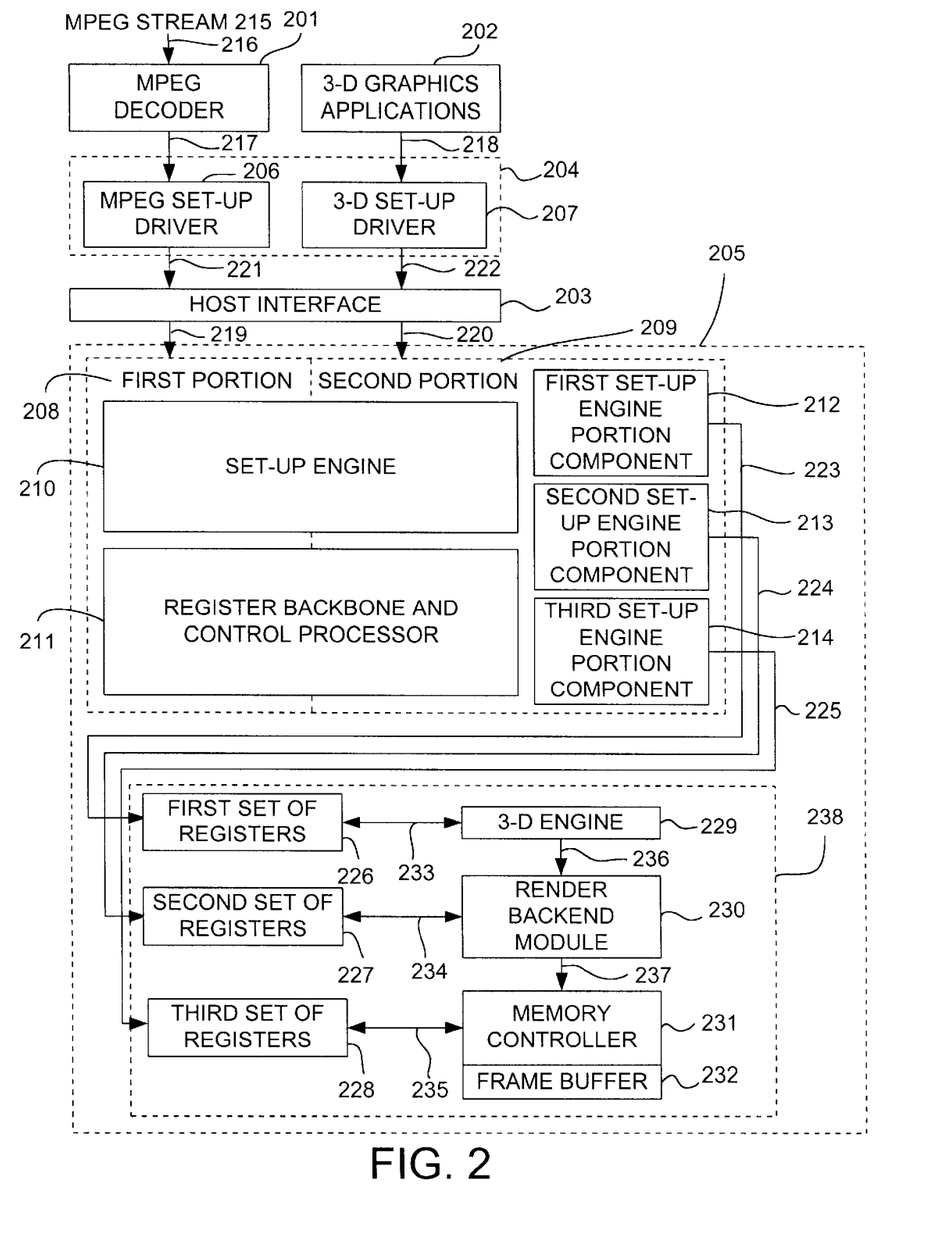
FIG. 2 is a block diagram illustrating a system in accordance with an embodiment of the present invention.

FIG. 2 is a block diagram illustrating a system in accordance with an embodiment of the present invention. The system includes MPEG decoder 201, 3-dimensional (3D) graphics applications 202, video graphics driver software 204, host interface bus 203, and video graphics hardware 205. An MPEG stream 215 is provided to MPEG decoder 201 via MPEG input 216. MPEG decoder 201 transforms MPEG stream information into a format suitable for hardware and provides these data 217 to MPEG set-up driver 206 of video graphic driver software 204. 3D graphics applications 202 provide object parameters 218 to 3D setup driver 207 of video graphics driver software 204. Video graphic driver software 204 includes MPEG set-up driver 206 and 3D set-up driver 207. Video graphic driver software 204 is coupled to host interface bus 203. MPEG set-up driver 206 provides IDCT data and frame references 221 to host interface 203. 3D set-up driver 207 provides object parameters 222 to host interface bus 203. Host interface 203 is coupled to video graphic hardware 205. Video graphic hardware 205 includes a setup engine 210 and control processor 211. The setup engine 210 and control processor 211 may be divided into a first portion 208 and a second portion 209. The first portion 208 receives an input 219 from host interface 203. The second portion 209 receives an input 220 from host interface 203. The first portion 208 and the second portion 209 convert their respective inputs to an output compatible with the register structure of 3-D engine 229. Both MPEG video and 3-D graphics may be processed using 3-D hardware registers of 3-D engine 229. The design of 3-D engine 229 can be made independent of the hardware/software interface of the MPEG algorithm, and later-implemented versions of 3-D engine 229 can be more easily supported.

The second portion 209 may also include a first setup engine portion component 212, a second setup engine portion component 213, and a third setup engine portion component 214. The first setup engine portion component 212 provides a first set of values 223 to a first set of registers 226. The second setup engine portion component 213 provides a second set of values 224 to a second set of registers 227. The third setup engine portion component 214 provides a third set of values 225 to a third set of registers 228. Alternatively, the first set of registers 226, the second set of registers 227, and the third set of registers 228 may be combined into a single unit.

Video graphic hardware 205 includes a drawing engine 238. The drawing engine 238 includes a first set of registers 226, a second set of registers 227, a third set of registers 228, a 3D engine 229, and a render back-end module 230 operatively coupled to a memory controller 231 and a frame buffer 232. 3D engine 229 receives input 233 from the first set of registers 226. 3D engine 229 passes per pixel information 236 to render back-end module 230. Render back-end module 230 receives input 234 from the second set of registers 227. Render back-end module 230 provides caches for pixels. Render back-end module 230 provides an output 237 to memory controller 231. Memory controller 231 is coupled to the third set of registers 228 via coupling 235. Memory controller 231 is coupled to frame buffer 232. Memory controller 231 retrieves and stores the information stored in frame buffer 232. The information stored in frame buffer 232 is displayed on a display monitor. Alternatively, multiple drawing engines may be provided to accommodate different video and graphics formats.

Figure 3:
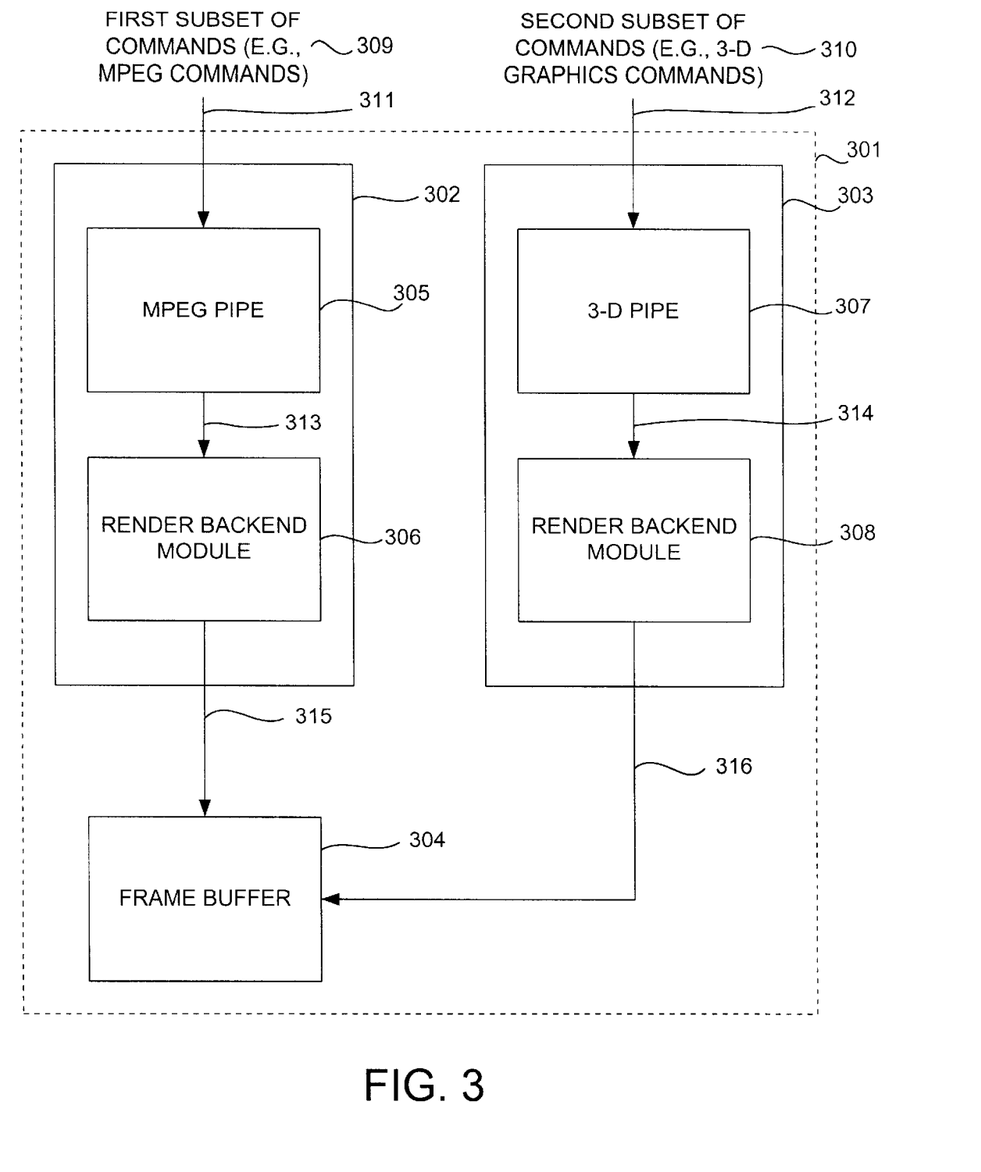
FIG. 3 is a block diagram of one embodiment of a drawing engine in accordance with the present invention.

FIG. 3 is a block diagram of one embodiment of a drawing engine in accordance with the present invention. The drawing engine 301 includes a first drawing engine component 302, a second drawing engine component 303, and a frame buffer 304. The first drawing engine component 302 includes an MPEG pipe 305 and a render back-end module 306. The second drawing engine component 303 includes a 3D pipe 307 and a render back-end module 308.

A first subset of commands 309, for example, MPEG commands, are provided to MPEG pipe 305 of the first drawing engine component 302 via input 311. MPEG pipe 305 provides per pixel information 313 to render back-end module 306 of first drawing engine component 302. Render back-end module 306 provides an output 315 to frame buffer 304. Note that output 315 may be provided to a memory controller coupled to frame buffer 304.

A second subset of commands 310, for example, 3D graphics commands, are provided to 3D pipe 307 of second drawing engine component 303 via input 312. 3D pipe 307 provides per pixel information 314 to render back-end module 308. Render back-end module 308 provides an output 316 to frame buffer 304. Note that the output 316 may be provided to a memory controller coupled to a frame buffer 314.

The first drawing engine component 302 and/or the second drawing engine component 303 may include a rasterizer component, a texture mapping component, a pixel pipe component, a render backend component, a prediction generating component, or other components. A rasterizer component converts a rectangular area of pixels called a macroblock into a sequence of individual pixel accesses. A texture mapping component creates the color component of a pixel based on a stored representation of an image. A pixel pipe component performs all arithmetic operations required to create a pixel fragment from at least one of a texture sample, a color sample, a fog component. A prediction creating component creates a prediction for a pixel based on at least one previously created pixel by applying linear interpolation. A render backend component creates a final pixel from at least one of a pixel fragment, an existing pixel, an IDCT sample, or a prediction.

Figure 4:
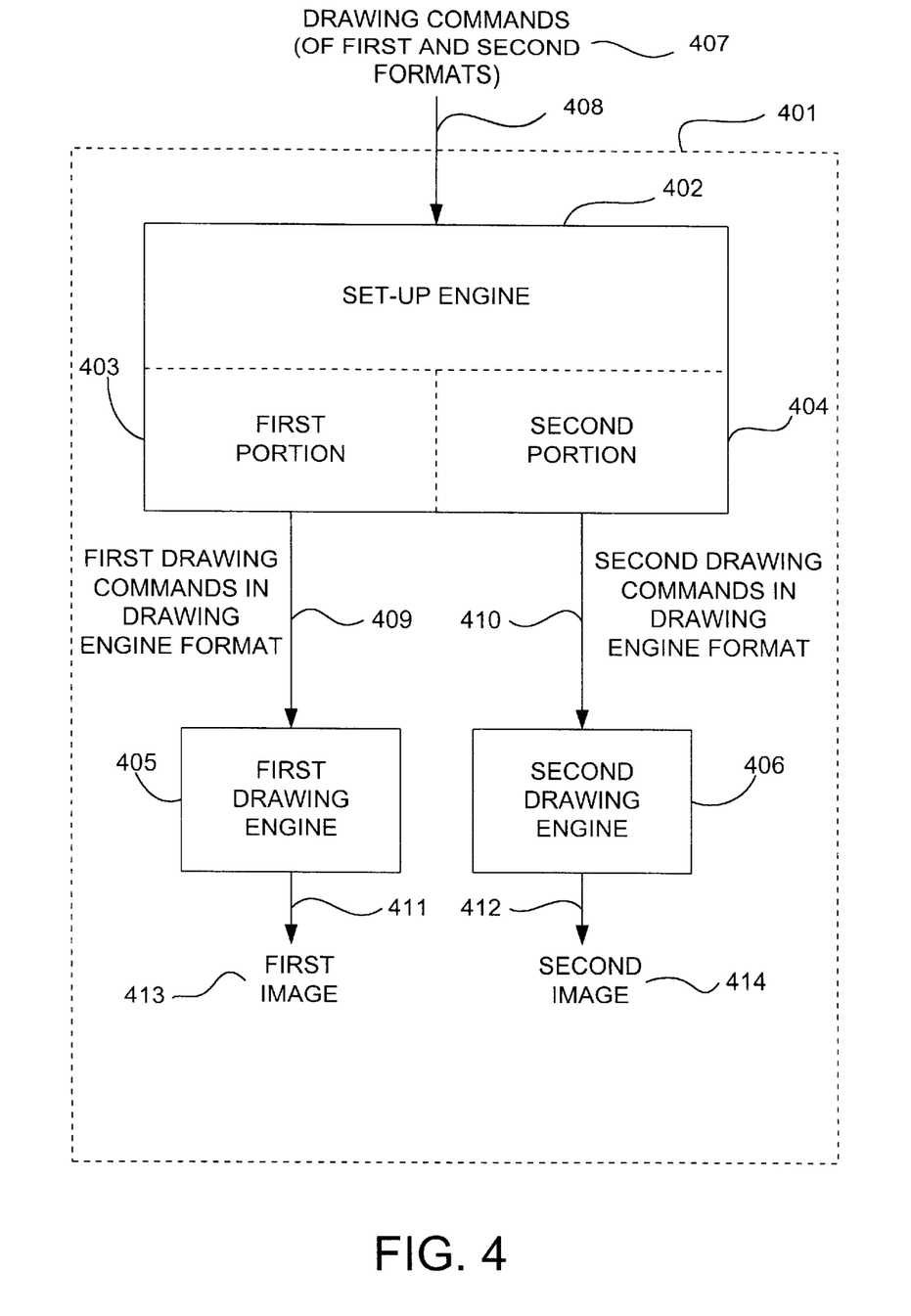
FIG. 4 is a block diagram illustrating an embodiment of video graphic hardware in accordance with the present invention.

FIG. 4 is a block diagram illustrating an embodiment of video graphic hardware in accordance with the present invention. Video graphic hardware 401 includes a setup engine 402, a first drawing engine 405, and a second drawing engine 406. The setup engine 402 may include a first portion 403 and a second portion 404.

Drawing commands 407, for example, drawing commands of a first and second format, are provided to setup engine 402 via input 408. The first portion 403 of the setup engine 402 recognizes and decodes drawing commands 407 of a first format and converts them to drawing commands 409 of a format required or understood by the first drawing engine 405, which may be referred to as a drawing engine format. This conversion includes but is not limited to arithmetic operations to convert pixel coordinates into memory addresses. First drawing engine 405 may include drawing engine elements as discussed previously. First drawing engine 405 provides an output 411 to create a first image 413.

Second portion 404 of setup engine 402 provides second drawing commands 410 in a drawing engine format to second drawing engine 406. Second drawing engine 406 may include drawing engine elements as previously described. Second drawing engine 406 provides an output 412 to create a second image 414.

Figure 5:
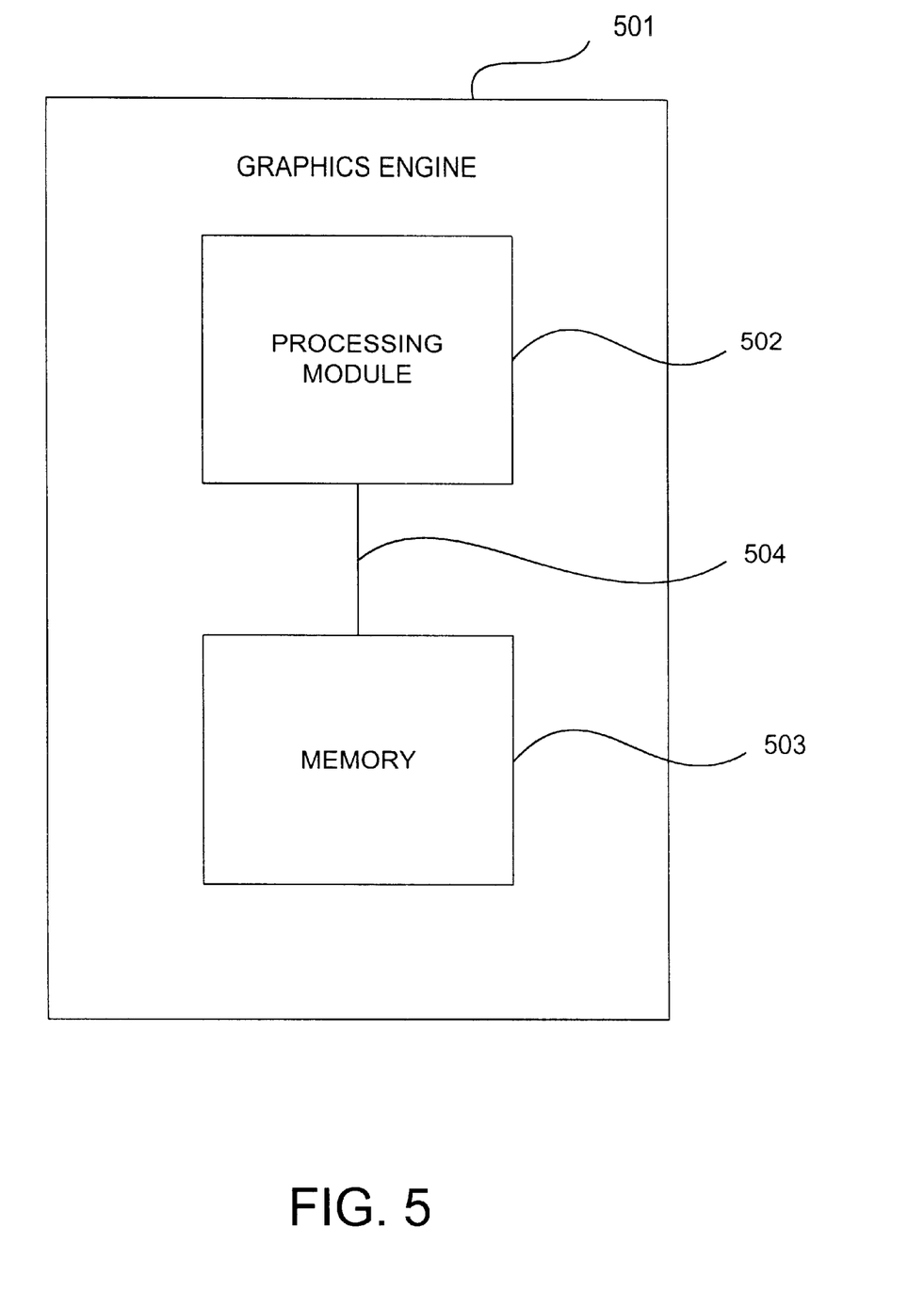
FIG. 5 is a block diagram illustrating an embodiment of a graphics engine in accordance with the present invention.

FIG. 5 is a block diagram illustrating an embodiment of a graphics system in accordance with the present invention. Graphics system 501 includes a processing module 502 and memory 503. The processing module 502 is coupled to memory 503 via coupling 504. Processing module 502 may be used to execute the process illustrated in FIG. 6. The processing module 502 may be a single processing device or a plurality of processing devices. Such a processing device may be a microprocessor, a microcontroller, a digital signal processor, a central processing unit, a microcomputer, a state machine, logic circuitry, and/or any other device that manipulates signals (analog or digital) based on operational instructions.

Memory 503 may be a single memory device or a plurality of memory devices. The memory device may be a random access memory, read-only memory, floppy disk memory, system disk memory, hard drive memory, external magnetic tape memory, CD-ROM, DVD, and/or any device that stores digital information. Note that when the processing module 502 implements one or more of its functions utilizing a state machine and/or logic circuitry, the memory 503 containing the corresponding instructions is embedded within the circuitry comprising the state machine and/or logic circuitry.

Figure 6:
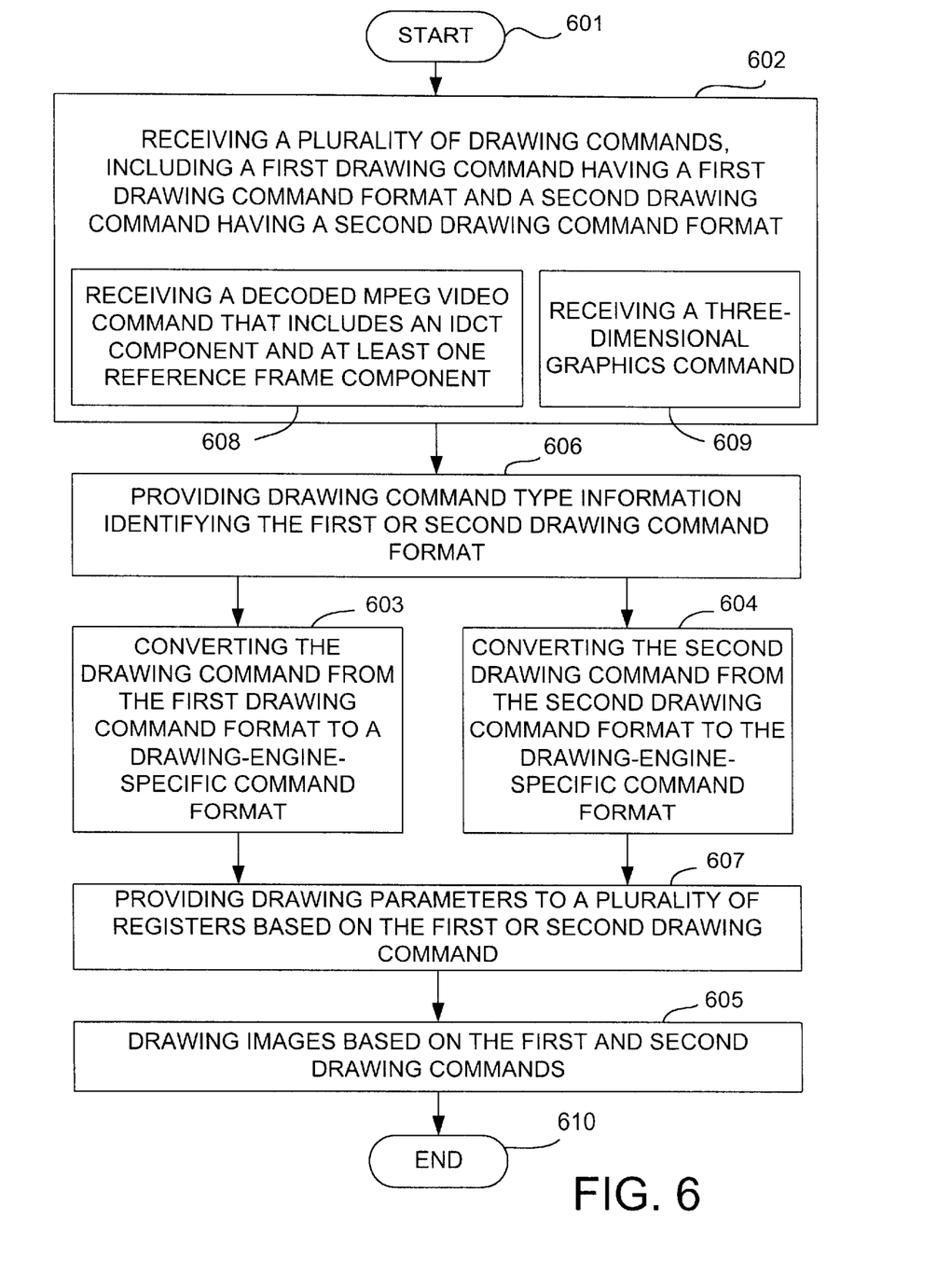
FIG. 6 is a flow diagram illustrating a process in accordance with an embodiment of the present invention.

FIG. 6 is a flow diagram illustrating a process in accordance with an embodiment of the present invention. The process begins in step 601 and continues to step 602. In step 602, a plurality of drawing commands are received, including a first drawing command having a first drawing command format and a second drawing command having a second drawing command format. Step 602 may also include steps 608 and/or 609. In step 608, a decoded MPEG video command that includes at least one of an IDCT component, a motion vector, and a frame reference is received. In step 609, a three-dimensional graphics command is received.

From step 602, the process continues to step 606. In step 606, drawing command type information identifying the first or second drawing command format is provided. From step 606, the process continues to either or both of steps 603 or 604. In step 603, a drawing command is converted from the first drawing command format to a drawing engine specific command format. In step 604, a second drawing command is converted from the second drawing command format to the drawing engine specific command format. From either or both of steps 603 or 604, the process continues to step 607. In step 607, drawing parameters are provided to a plurality of registers based on the first or second drawing command. From step 607, the process continues to step 605. In step 605, images are drawn based on the first and second drawing commands. The process ends in step 610.

Accordingly, a method and apparatus for motion compensation using a hardware-assisted abstraction layer has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A graphics controller comprising:
    a set-up engine operatively coupled to receive a plurality of drawing commands that include a first drawing command having a first drawing command format and a second drawing command having a second drawing command format, wherein the set-up engine includes a first set-up engine portion to convert the first drawing command from the first drawing command format to a drawing-engine-specific command format and a second set-up engine portion to convert the second drawing command from the second drawing command format to the drawing-engine-specific command format;
    a drawing engine operatively coupled to the set-up engine to receive the first or second drawing command expressed in the drawing-engine-specific command format based on whether the first set-up engine portion or second set-up engine portion is active and to draw an image based on the first or second drawing command.

2. The graphics controller of claim 1 wherein the set-up engine further functions to provide drawing command type information to the drawing engine, wherein the drawing command type information identifies the first or second drawing command format.

3. The graphics controller of claim 1 wherein the drawing engine further comprises a three-dimensional graphics engine, a rendering backend module, and a plurality of registers, wherein a first set of the plurality of registers is associated with the three-dimensional graphics engine and a second set of the plurality of registers is associated with the rendering backend module, wherein the first or second drawing command provides drawing parameters to at least some of the plurality of registers.

4. The graphics controller of claim 3 wherein the first drawing command comprises a decoded Moving Picture Experts Group (MPEG) video command, wherein the decoded MPEG video command includes at least one of an error term, a motion vector, a reference to a frame, and a control command, wherein the first set-up engine portion uses the motion vector and the reference to the frame to generate drawing-engine-specific commands, the drawing-engine-specific commands being issued to the plurality of registers.

5. The graphics controller of claim 4 wherein the second drawing command comprises a three-dimensional graphics command that includes three-dimensional object element vertex parameters, wherein the second set-up engine portion maps the three-dimensional object element vertex parameters to the plurality of registers.

6. The graphics controller of claim 1 wherein the drawing engine comprises a plurality of drawing engine components including a first drawing engine component and a second drawing engine component, the first drawing engine component processing a first subset of the plurality of drawing commands expressed in the drawing-engine-specific command format and the second drawing engine component processing a second subset of the plurality of drawing commands expressed in the drawing-engine-specific command format.

7. The graphics controller of claim 6 wherein the first drawing engine component and the second drawing engine component are selected from a group consisting of:
    a rasterizer component
    a texture mapping component;
    a pixel pipe component;
    a render backend component; and
    a prediction generating component.

8. The graphics controller of claim 7 wherein the first set-up engine portion is associated with the plurality of drawing engine components and the second set-up engine portion includes a plurality of set-up engine portion components including a first set-up engine portion component and a second set-up engine portion component, the first set-up engine portion component associated with the first drawing engine component and the second set-up engine portion component associated with the second drawing engine component.

9. The graphics controller of claim 1 wherein the drawing engine comprises a component selected from a group consisting of:
    a rasterizer component
    a texture mapping component;
    a pixel pipe component;
    a render backend component; and
    a prediction generating component.

10. The graphics controller of claim 1 wherein the drawing engine comprises a plurality of registers, the first and second drawing commands expressed in the drawing-engine-specific command format causing drawing parameters to be stored in the plurality of registers.

11. The graphics controller of claim 1 further comprising:
    a rendering backend module coupled to the drawing engine, the rendering backend module including a plurality of registers, the first and second drawing commands expressed in the drawing-engine-specific command format causing drawing parameters to be stored in the plurality of registers.

12. The graphics controller of claim 1 further comprising:
a memory controller coupled to the drawing engine, the memory controller including a plurality of registers, the first and second drawing commands expressed in the drawing-engine-specific command format causing drawing parameters to be stored in the plurality of registers.

13. A graphics controller comprising:
a set-up engine operatively coupled to receive a plurality of drawing commands that include a first drawing command having a first drawing command format and a second drawing command having a second drawing command format, wherein the set-up engine includes a first set-up engine portion to convert the first drawing command from the first drawing command format to a drawing-engine-specific command format and a second set-up engine portion to convert the second drawing command from the second drawing command format to the drawing-engine-specific command format;
a first drawing engine operatively coupled to the set-up engine to receive the first drawing command expressed in the drawing-engine-specific command format and to draw a first image based on the first drawing command; and
a second drawing engine operatively coupled to the set-up engine to receive the second drawing command expressed in the drawing-engine-specific command format and to draw a second image based on the second drawing command.

14. The graphics controller of claim 13 wherein the first drawing command comprises a decoded (Moving Picture Experts Group) MPEG video command, wherein the decoded MPEG video command includes at least one of an error term, a motion vector, a reference to a frame, and a control command, wherein the first set-up engine uses the motion vector and the reference to the frame to generate drawing-engine-specific commands, the drawing-engine-specific commands being issued to the plurality of registers.

15. The graphics controller of claim 14 wherein the second drawing command comprises a three-dimensional graphics command.

16. The graphics controller of claim 13 wherein the first drawing engine comprises a plurality of drawing engine components including a first drawing engine component and a second drawing engine component, the first drawing engine component processing a first subset of the plurality of drawing commands expressed in the drawing-engine-specific command format and the second drawing engine component processing a second subset of the plurality of drawing commands expressed in the drawing-engine-specific command format.

17. The graphics controller of claim 16 wherein the first drawing engine component and the second drawing engine component are selected from a group consisting of:
a rasterizer component;
a texture mapping component;
a pixel pipe component; and
a render backend component; and
a prediction generating component.

18. The graphics controller of claim 17 wherein the first set-up engine portion is associated with the plurality of drawing engine components and the second set-up engine portion includes a plurality of set-up engine portion components including a first set-up engine portion component and a second set-up engine portion component, the first set-up engine portion component associated with the first drawing engine component and the second set-up engine portion component associated with the second drawing engine component.

19. The graphics controller of claim 13 wherein the first drawing engine comprises a plurality of registers, the first and second drawing commands expressed in the drawing-engine-specific command format causing drawing parameters to be stored in the plurality of registers.

20. The graphics controller of claim 13 further comprising:
a render backend coupled to the first drawing engine, the render backend including a plurality of registers, the first and second drawing commands expressed in the drawing-engine-specific command format causing drawing parameters to be stored in the plurality of registers.

21. The graphics controller of claim 13 further comprising:
a memory controller coupled to the first drawing engine, the memory controller including a plurality of registers, the first and second drawing commands expressed in the drawing-engine-specific command format causing drawing parameters to be stored in the plurality of registers.

22. A method for managing graphic controller registers comprising the steps of:
receiving a plurality of drawing commands, including a first drawing command having a first drawing command format and a second drawing command having a second drawing command format;
converting the drawing command from the first drawing command format to a drawing-engine-specific command format;
converting the second drawing command from the second drawing command format to the drawing-engine-specific command format;
drawing images based on the first and second drawing commands.

23. The method of claim 22 further comprising the step of:
providing drawing command type information identifying the first or second drawing command format.

24. The method of claim 22 further comprising the step of:
providing drawing parameters to a plurality of registers based on the first or second drawing command.

25. The method of claim 24 wherein the step of receiving the plurality of drawing commands includes the step of:
receiving a decoded Moving Picture Experts Group (MPEG) video command, wherein the decoded MPEG video command includes at least one of an error term, a motion vector, a reference to a frame, and a control command, wherein the first set-up engine portion uses the motion vector and the reference to the frame to generate drawing-engine-specific commands, the drawing-engine-specific commands being issued to the plurality of registers.

26. The method of claim 25 wherein the step of receiving the plurality of drawing commands further includes the step of:
receiving a three-dimensional graphics command.

27. A program storage device readable by a machine, the program storage device tangibly embodying a program of instructions executable by the machine to perform steps for managing graphic controller registers of said machine, said steps comprising:
receiving a plurality of drawing commands, including a first drawing command having a first drawing command format and a second drawing command having a second drawing command format;

converting the drawing command from the first drawing command format to a drawing-engine-specific command format;

converting the second drawing command from the second drawing command format to the drawing-engine-specific command format;

drawing images based on the first and second drawing commands.

28. The program storage device of claim 27 further comprising instructions to perform the step of:

providing drawing command type information identifying the first or second drawing command format.

29. The program storage device of claim 27 further comprising instructions to perform the step of:

providing drawing parameters to a plurality of registers based on the first or second drawing command.

30. The program storage device of claim 27 further comprising instructions to perform the step of:

receiving a decoded Moving Picture Experts Group (MPEG) video command, wherein the decoded MPEG video command includes at least one of an error term, a motion vector, a reference to a frame, and a control command, wherein the first set-up engine portion uses the motion vector and the reference to the frame to generate drawing-engine-specific commands, the drawing-engine-specific commands being issued to the plurality of registers.

31. The program storage device of claim 30 further comprising instructions to perform the step of:

receiving a three-dimensional graphics command.

* * * * *